(12) United States Patent
Zhou et al.

(10) Patent No.: US 10,353,231 B2
(45) Date of Patent: Jul. 16, 2019

(54) TOUCH DISPLAY DEVICE, TOUCH DISPLAY PANEL AND METHOD FOR MANUFACTURING TOUCH DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan Province (CN)

(72) Inventors: Gang Zhou, Beijing (CN); Hua Tian, Beijing (CN); Jianbiao Zhang, Beijing (CN); Xiaofei Yang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/674,441

(22) Filed: Aug. 10, 2017

(65) Prior Publication Data

US 2018/0081220 A1    Mar. 22, 2018

(30) Foreign Application Priority Data

Sep. 20, 2016   (CN) .......................... 2016 1 0834915

(51) Int. Cl.
*G06F 3/041*   (2006.01)
*G06F 3/044*   (2006.01)
(Continued)

(52) U.S. Cl.
CPC ........ *G02F 1/13338* (2013.01); *G02F 1/1341* (2013.01); *G02F 1/1345* (2013.01);
(Continued)

(58) Field of Classification Search
CPC .......... G02F 1/13338; G02F 1/133514; G02F 1/133516; G02F 1/1341; G02F 1/134309;
(Continued)

(56) References Cited

U.S. PATENT DOCUMENTS

2014/0152616 A1*  6/2014  Kida ...................... G06F 3/0418
                                                                    345/174
2016/0291221 A1* 10/2016  Meng ..................... G02B 5/201
(Continued)

FOREIGN PATENT DOCUMENTS

CN         103294291 A    9/2013
CN         103677411 A    3/2014
(Continued)

OTHER PUBLICATIONS

First Office Action for Chinese Application No. 201610834915.1, dated Aug. 13, 2018, 8 Pages.

*Primary Examiner* — Nathanael R Briggs
(74) *Attorney, Agent, or Firm* — Brooks Kushman P.C.

(57) ABSTRACT

A touch display device, a touch display panel and a method for manufacturing the touch display panel are provided. The touch display panel includes a first substrate, a second substrate and a liquid crystal layer. The first substrate includes a first base, a touch electrode layer and a color filter layer. The touch electrode layer is arranged at any side of the first base, and the first base is divided into an electrode region and a wiring region. A light transmittance of the color filter layer and a light transmittance of the touch electrode layer are capable of compensating for each other, so that a difference between a light transmittance of the first substrate at the electrode region and a light transmittance of the first substrate at the wiring region is smaller than a threshold.

14 Claims, 7 Drawing Sheets

(51) Int. Cl.
*G02F 1/1333* (2006.01)
*G02F 1/1335* (2006.01)
*G02F 1/1341* (2006.01)
*G02F 1/1343* (2006.01)
*G02F 1/1345* (2006.01)

(52) U.S. Cl.
CPC .... *G02F 1/13439* (2013.01); *G02F 1/133514* (2013.01); *G02F 1/133516* (2013.01); *G02F 1/134309* (2013.01); *G06F 3/044* (2013.01); *G06F 3/0412* (2013.01); *G02F 2201/50* (2013.01); *G06F 2203/04103* (2013.01)

(58) Field of Classification Search
CPC ............... G02F 1/13439; G02F 1/1345; G02F 2201/50; G06F 3/0412; G06F 3/044; G06F 2203/04103
See application file for complete search history.

(56) References Cited

U.S. PATENT DOCUMENTS

2016/0342249 A1  11/2016  Zhou et al.
2018/0143711 A1* 5/2018  Ono ..................... G02F 1/1333

FOREIGN PATENT DOCUMENTS

| CN | 103761003 A | 4/2014 |
| CN | 104461146 A | 3/2015 |
| CN | 105068347 A | 11/2015 |

* cited by examiner

TOUCH DISPLAY DEVICE, TOUCH DISPLAY PANEL AND METHOD FOR MANUFACTURING TOUCH DISPLAY PANEL

CROSS-REFERENCE TO RELATED APPLICATION

The present application claims a priority of the Chinese patent application No. 201610834915.1 filed on Sep. 20, 2016, which is incorporated herein by reference in its entirety.

TECHNICAL FIELD

The present disclosure relates to the field of display technology, in particular to a touch display device, a touch display panel and a method for manufacturing the touch display panel.

BACKGROUND

Currently, demands on various display devices increases along with the development of the global information society, so great efforts have been made for the researches and development on various flat-panel display devices, e.g., liquid crystal display (LCD), plasma display panel (PDP), electroluminescent display (LED) and vacuum fluorescent display (VFD). Various flat-panel display devices have been developed as displays for various devices.

Along with the development of the technology, a touch display device having both a touch function and a display function has attracted more and more attention due to its operability. Along with the development of the touch technology, a capacitive touch technology has been widely used due to its advantages such as touch sensitivity and a capability of supporting a multi-point touch operation.

For a conventional single-layer touch panel structure (e.g., On-Cell or One Glass Solution (OGS)), a transparent conductive layer is formed at a surface of a glass substrate, so as to form a touch electrode and an electrode lead through exposing, developing and etching. However, coverage ratios of a touch layer at different portions of the touch panel are different from each other, so light transmittances of the touch layer at different regions of the touch panel are different from each other. As a result, the entire touch panel may have an uneven light transmittance, and bright and dark stripes may occur alternately during the touch and display procedures.

SUMMARY

An object of the present disclosure is to provide a touch display device, a touch display panel, and a method for manufacturing the touch display panel, so as to prevent the occurrence of bright and dark stripes due to the uneven light transmittance of the entire touch panel during the touch and display procedures.

In one aspect, the present disclosure provides in some embodiments a touch display panel, including a first substrate, a second substrate arranged opposite to the first substrate, and a liquid crystal layer arranged between the first substrate and the second substrate. The first substrate includes a first base, a touch electrode layer and a color filter layer. The touch electrode layer is arranged at any side of the first base, and the first base is divided into an electrode region and a wiring region. A coverage ratio of the touch electrode layer at the electrode region is greater than a coverage ratio of the touch electrode layer at the wiring region, and a light transmittance of the color filter layer and a light transmittance of the touch electrode layer are capable of compensating for each other, so that a difference between a light transmittance of the first substrate at the electrode region and a light transmittance of the first substrate at the wiring region is smaller than a threshold.

In a possible embodiment of the present disclosure, the light transmittance of the first substrate at the electrode region is equal to the light transmittance of the first substrate at the wiring region.

In a possible embodiment of the present disclosure, a thickness of the color filter layer at the electrode region is greater than a thickness of the color filter layer at the wiring region.

In a possible embodiment of the present disclosure, the color filter layer is arranged at a side of the first base adjacent to the liquid crystal layer, and the touch electrode layer is arranged at a side of the first base away from the liquid crystal layer.

In a possible embodiment of the present disclosure, the touch display panel further includes a protection layer, and the color filter layer is arranged between the first base and the protection layer.

In a possible embodiment of the present disclosure, the touch electrode layer includes a plurality of first sensing electrodes extending in a column direction and a plurality of second sensing electrodes extending in the column direction, and the first sensing electrodes and the second sensing electrodes are arranged alternately.

In a possible embodiment of the present disclosure, each of the first sensing electrodes includes a plurality of sub-electrodes arranged in the column direction and independent of each other, each sub-electrode is connected to a driver through an individual first lead, and the sub-electrodes in an identical row are connected to each other through a lead.

In a possible embodiment of the present disclosure, each of the second sensing electrodes is connected to the driver through a second lead.

In a possible embodiment of the present disclosure, the electrode region has an area greater than that of the wiring region.

In another aspect, the present disclosure provides in some embodiments a touch display device including a touch display panel. The touch display panel includes a first substrate, a second substrate arranged opposite to the first substrate, and a liquid crystal layer arranged between the first substrate and the second substrate. The first substrate includes a first base, a touch electrode layer and a color filter layer. The touch electrode layer is arranged at any side of the first base, and the first base is divided into an electrode region and a wiring region. A coverage ratio of the touch electrode layer at the electrode region is greater than a coverage ratio of the touch electrode layer at the wiring region, and a light transmittance of the color filter layer and a light transmittance of the touch electrode layer are capable of compensating for each other, so that a difference between a light transmittance of the first substrate at the electrode region and a light transmittance of the first substrate at the wiring region is smaller than a threshold.

In yet another aspect, the present disclosure provides in some embodiments a method for manufacturing a touch display panel, including steps of: providing a first base and dividing the first base into an electrode region and a wiring region; forming a touch electrode layer at any side of the first base, a coverage ratio of the touch electrode layer at the electrode region being greater than a coverage ratio of the touch electrode layer at the wiring region; forming a color filter layer on the first base to acquire a first substrate, a light transmittance of the color filter layer and a light transmittance of the touch electrode layer being capable of compensating for each other so that a difference between a light transmittance of the first substrate at the electrode region and a light transmittance of the first substrate at the wiring region is smaller than a threshold; providing a second substrate; and enabling the first substrate and the second substrate to be arranged opposite to each other to form a cell, and filling liquid crystals between the first substrate and the second substrate, so as to form the touch display panel.

In a possible embodiment of the present disclosure, prior to the step of forming the color filter layer on the first base to acquire the first substrate, the light transmittance of the color filter layer and the light transmittance of the touch electrode layer being capable of compensating for each other so that the difference between the light transmittance of the first substrate at the electrode region and the light transmittance of the first substrate at the wiring region is smaller than the threshold, the method further includes: collecting a first light transmittance of the touch electrode layer at the electrode region and a second light transmittance of the touch electrode layer at the wiring region; determining a first ratio of the first light transmittance to a reference value and a second ratio of the second light transmittance to the reference value; and determining a first thickness of the color filter layer at the electrode region and a second thickness of the color filter layer at the wiring region in accordance with the first ratio and the second ratio respectively.

In a possible embodiment of the present disclosure, the step of forming the color filter layer on the first base includes forming the color filter layer on the first base in accordance with the first thickness and the second thickness, a thickness of the color filter layer at the electrode region being equal to the first thickness, and a thickness of the color filter layer at the wiring region being equal to the second thickness.

In a possible embodiment of the present disclosure, the step of forming the touch electrode layer and the color filter layer includes forming the color filter layer at a side of the first base adjacent to the liquid crystal layer and forming the touch electrode layer at a side of the first base away from the crystal layer.

In a possible embodiment of the present disclosure, the step of forming the touch electrode layer includes forming a plurality of first sensing electrodes extending in a column direction and a plurality of second sensing electrodes extending in the column direction. The first sensing electrodes and the second sensing electrodes are arranged alternately, each of the first sensing electrodes includes a plurality of sub-electrodes arranged in the column direction and spaced apart from each other, each sub-electrode is connected to a driver through a separate lead, and the sub-electrodes in an identical row are connected to each other through a lead.

According to the touch display device, the touch display panel and the method for manufacturing the touch display panel in the embodiments of the present disclosure, the touch display panel includes the first substrate, the second substrate and the liquid crystal layer. The first substrate includes the first base, the touch electrode layer and the color filter layer. The touch electrode layer is arranged at any side of the first base, and the first base is divided into the electrode region and the wiring region. The light transmittance of the color filter layer and the light transmittance of the touch electrode layer are capable of compensating for each other, so that the difference between the light transmittance of the first substrate at the electrode region and the light transmittance of the first substrate at the wiring region is smaller than the predetermined threshold. As a result, it is able to provide the entire touch display panel with a substantially uniform light transmittance, thereby to prevent the occurrence of bright and dark stripes during the touch and display procedures.

DETAILED DESCRIPTION

In order to make the objects, the technical solutions and the advantages of the present disclosure more apparent, the present disclosure will be described hereinafter in conjunction with the drawings and embodiments.

Figure 1:
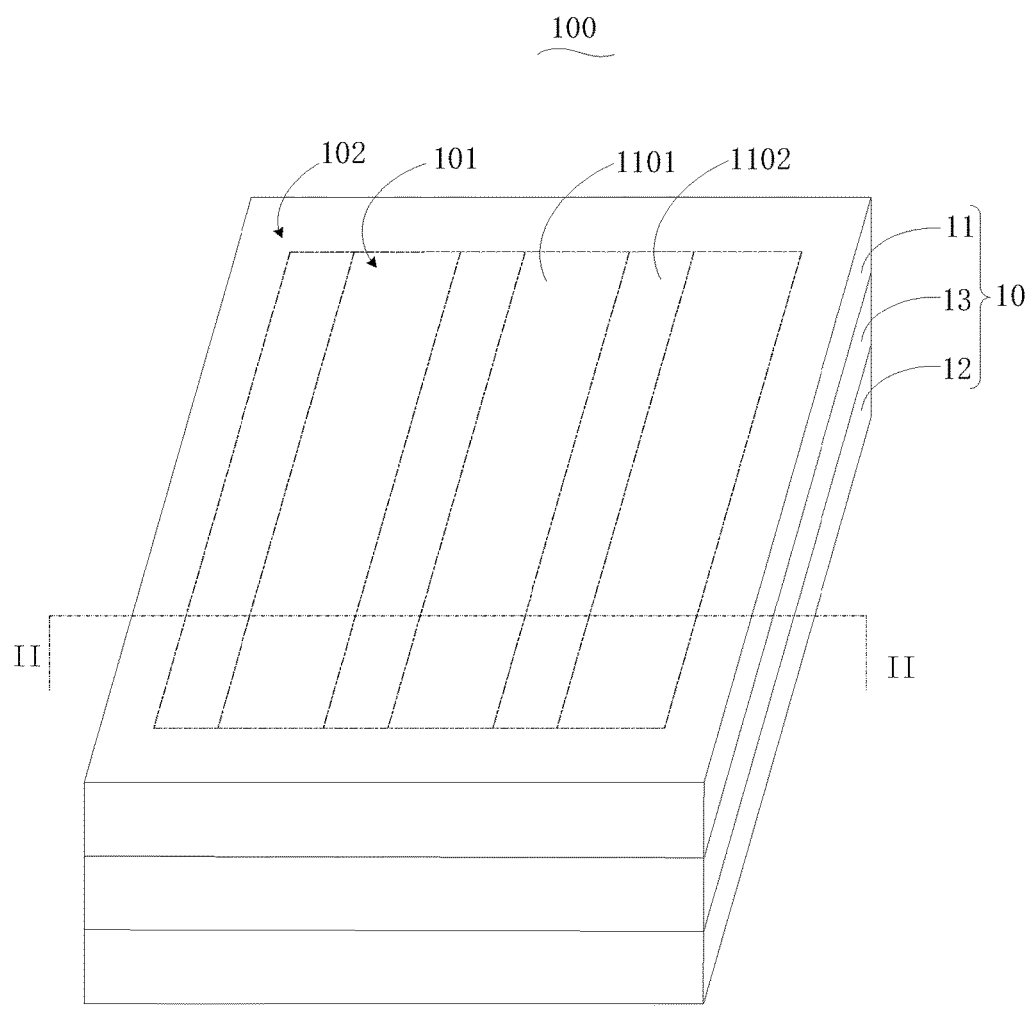
FIG. 1 is a solid view of a touch display device according to one embodiment of the present disclosure.

As shown in FIG. 1 which is a solid view of a touch display device according to one embodiment of the present disclosure, the touch display device 100 includes a touch display panel 10. The touch display panel 10 includes a first substrate 11, a second substrate 12 arranged opposite to the first substrate 11, and a liquid crystal layer 13 arranged between the first substrate 11 and the second substrate 12. The touch display device 100 further includes a function region 101 and a peripheral region 102 surrounding the function region 101. The function region 101 may be configured to achieve a touch function and a display function.

Figure 2:
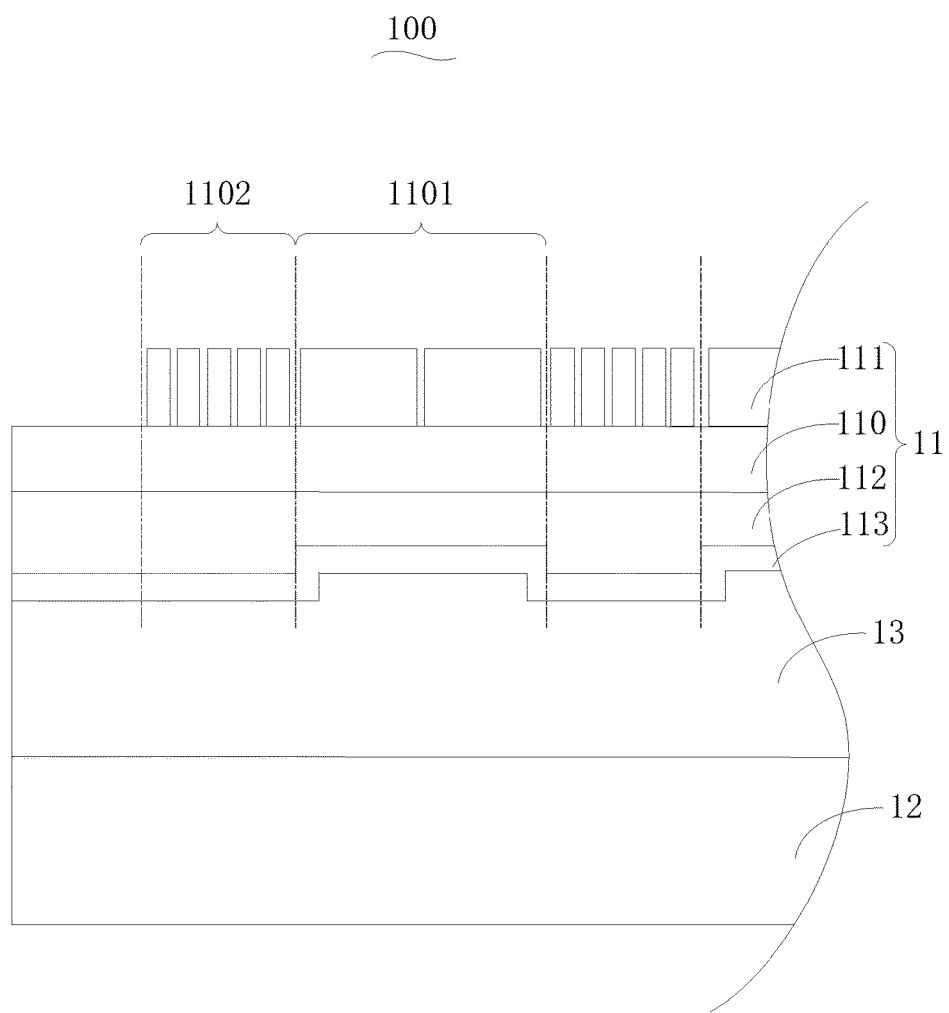
FIG. 2 is a sectional view of the touch display device along line II-II in FIG. 1.

Referring to FIG. 2 which is a sectional view of the touch display device along line II-II in FIG. 1, the first substrate 11 includes a first base 110, a touch electrode layer 111, a color filter layer 112 and a protection layer 113. The touch electrode layer 111 is arranged at a side of the first base 110 away from the liquid crystal layer 13. The color filter layer 112 is arranged at a side of the first base 110 adjacent to the liquid crystal layer 13 and between the first base 110 and the protection layer 113.

A portion of the first base 110 corresponding to the function region 101 is divided into electrode regions 1101 and wiring regions 1102 arranged alternately, and touch sensing electrodes and wires for the touch electrode layer 111 are arranged at the electrode regions 1101 and the wiring regions 1102 respectively. In the embodiments of the present disclosure, for clarification, merely three electrode regions 1101 and three wiring regions 1102 are shown in FIG. 1.

Figure 3:
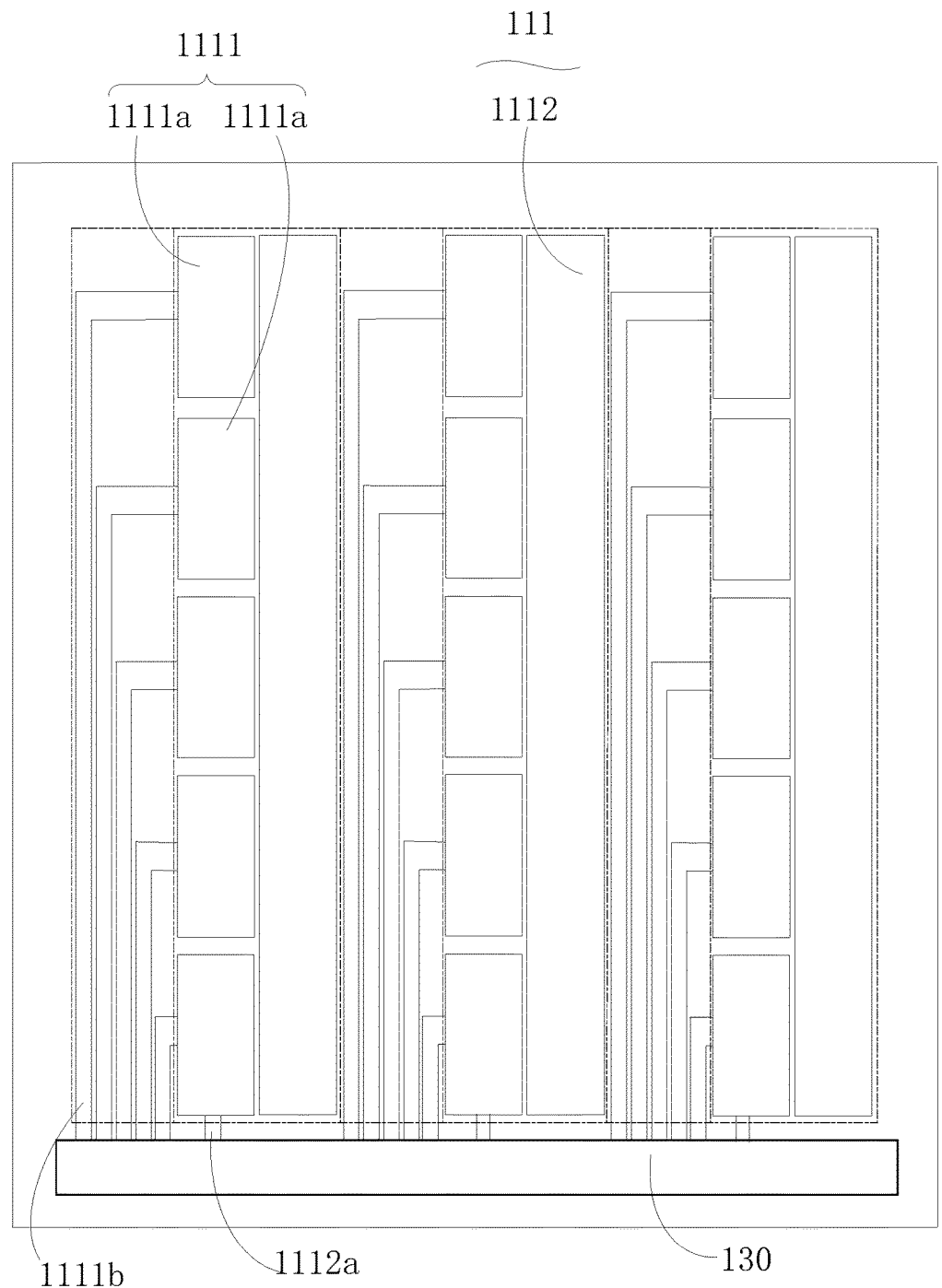
FIG. 3 is a planar view of a touch electrode layer in FIG. 2.
Figure 4:
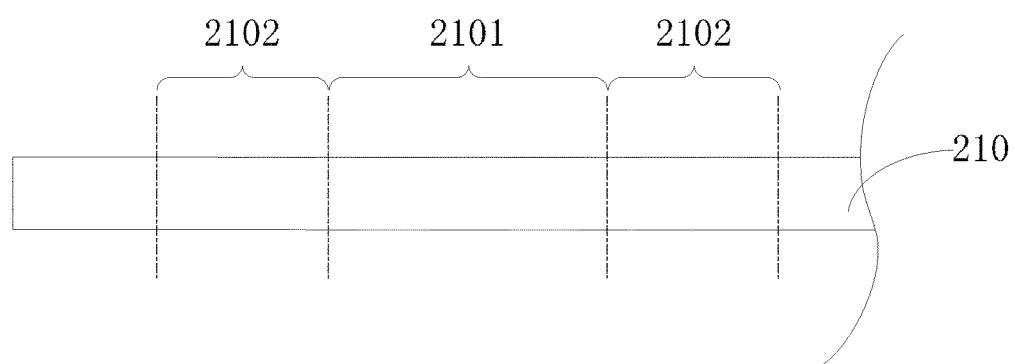
FIGS. 4 to 7 are sectional views of a touch display panel during manufacturing the touch display panel according to one embodiments of the present disclosure.
Figure 5:
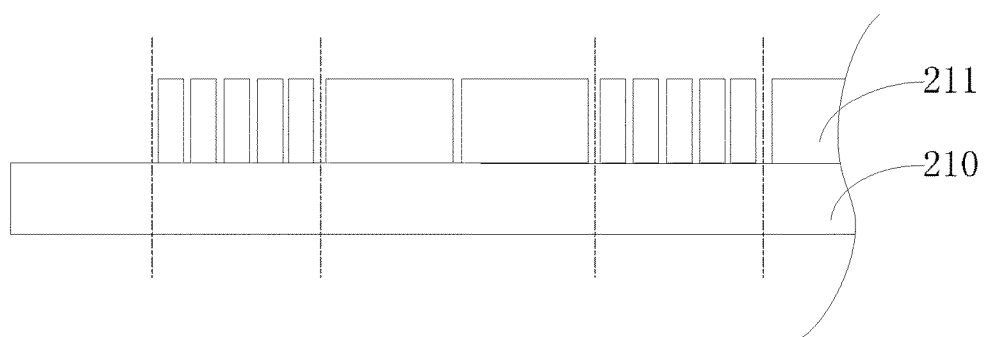
Figure 6:
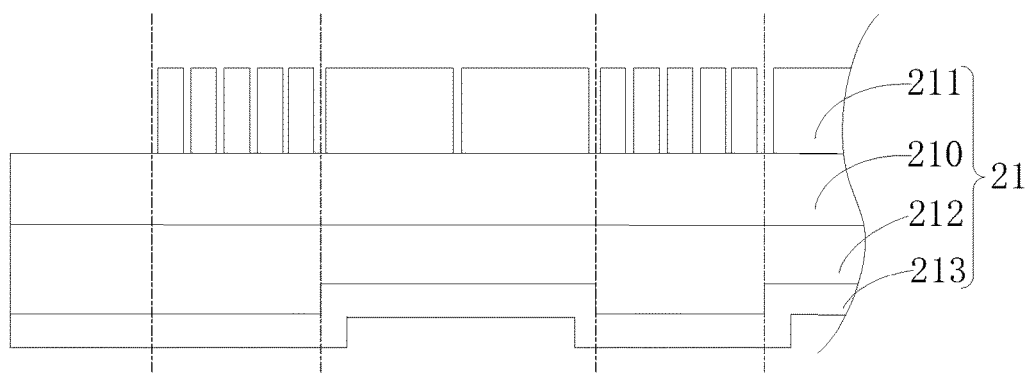
Figure 7:
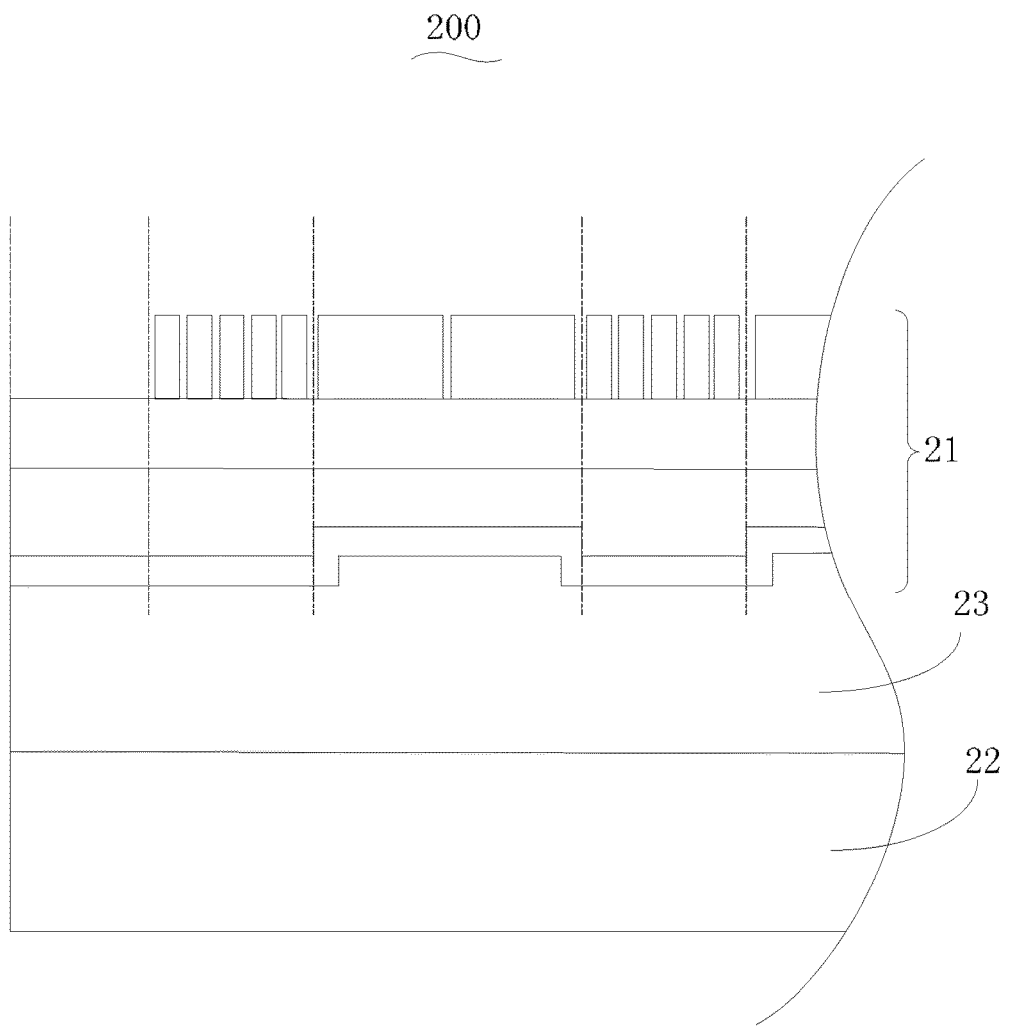

Referring to FIG. 3 which is a planar view of the touch electrode layer 111 in FIG. 2, the touch electrode layer 111 includes a plurality of first sensing electrodes 1111 and a plurality of second sensing electrodes 1112. Each of the first sensing electrodes 1111 extends in a column direction, and each of the second sensing electrodes 1112 extends in the column direction too. The first sensing electrodes 1111 and the second sensing electrodes 1112 are arranged alternately at the electrode regions 1101.

In a possible embodiment of the present disclosure, one of the first sensing electrodes 1111 and one of the second sensing electrodes 1112 are arranged side by side at each of the electrode regions 1101. However, the present disclosure is not limited thereto, and in some other embodiments of the present disclosure, the arrangement mode of the first sensing electrodes 1111 and the second sensing electrodes 1112 may be selected in accordance with the practical need.

Each of the first sensing electrodes 1111 may include a plurality of sub-electrodes 111a arranged in the column direction and independent of each other. Each sub-electrode 1111a is connected to a driver 130 at the peripheral region 102 through an individual first lead 1111b. One end of each first lead 1111b is connected to one of the sub-electrodes 111a, and the first lead 1111b extends through the wiring region 1102 to the peripheral region 102, and then the other end thereof is connected to the driver. In other words, the first lead 1111b is located at the corresponding wiring region 1102. The sub-electrodes 1111a in an identical row are connected to each other through the first lead 1111b and configured to receive an identical driving signal from the driver. Each of the second sensing electrodes 1112 is connected to the driver 130 through a second lead 1112a.

As shown in FIGS. 2 and 3, each electrode region 1101 has an area greater than that of each wiring region 1102. The touch electrode layer 111 is mainly configured to achieve a touch function of the touch display device 100, so the electrodes of the touch electrode layer 111 for the touch function are substantially arranged at the electrode regions 1101. The wiring regions 1102 are mainly used for the layout of wires which are spaced apart from each other. A larger portion of the wring region 1102 is not covered by the wires, i.e., a smaller portion of the wring region 1102 is covered by the electrodes. Hence, a coverage ratio of the touch electrode layer 111 at the electrode regions 1101 is greater than a coverage ratio of the touch electrode layer 111 at the wiring regions 1102.

For a conventional touch display device, the coverage ratio of the touch electrode layer 111 at the electrode regions 1101 is greater than the coverage region of the touch electrode layer 111 at the wiring regions 1102, and in use, the light transmittance of the entire touch display device is uneven. As a result, bright and dark stripes may occur on the touch panel during the touch and display procedures.

In order to solve the above-mentioned problem, in the embodiments of the present disclosure, a light transmittance of the color filter layer 112 and a light transmittance of the touch electrode layer 111 are capable of compensating for each other, so that a difference between a light transmittance of the first substrate 11 at the electrode region 1101 and a light transmittance of the first substrate 11 at the wiring region 1102 is smaller than a predetermined threshold, so as to prevent the occurrence of the stripes for the touch display device 100 in use.

The predetermined threshold may be set in accordance with different accuracy requirements of the touch display device. In the case that the accuracy is highly demanded, the predetermined threshold may be set as a relatively small value, and in the case that the accuracy is not so highly demanded, the predetermined threshold may be set as a relatively large value, as long as it is acceptable to users.

In a possible embodiment of the present disclosure, the difference between the light transmittance of the first substrate 11 at the electrode region 1101 and the light transmittance of the first substrate 11 at the wiring region 1102 is 0, i.e., the light transmittance of the first substrate 11 at the electrode region 1101 is equal to the light transmittance of the first substrate 11 at the wiring region 1102.

In order to compensate for the light transmittance of the touch electrode layer 111 with the color filter layer 112, a thickness of the color filter layer 112 at the electrode region 1101 may be different from a thickness of the color filter layer 112 at the wiring region 1102.

Because the coverage ratio of the touch electrode layer 111 at the electrode region 1101 is greater than the coverage ratio of the touch electrode layer 111 at the wiring region 1102, the light transmittance of the touch electrode layer 111 at the electrode region 1101 should be smaller than the light transmittance of the touch electrode layer 111 at the wiring region 1102. In this regard, in order to compensate for the light transmittance of the touch electrode layer 111, the difference between the light transmittance of the first substrate 11 at the electrode region 1101 and the light transmittance of the first substrate 11 at the wiring region 1102 may be within an acceptable range, and the thickness of the color filter layer 112 at the electrode region 1101 may be smaller than the thickness of the color filter layer 112 at the wiring region 1102.

In the embodiments of the present disclosure, the first substrate 11 is a color filter substrate, and the second substrate is a thin film transistor (TFT) substrate, but the present disclosure is not limited thereto. In some other embodiments of the present disclosure, the first substrate may be a TFT substrate, and the second substrate may be a color filter substrate.

For the touch display device 100, the above description is given by taking the touch electrode layer at a side of the first base away from the liquid crystal layer as an example, but the present disclosure is not limited thereto. In some other embodiments of the present disclosure, the touch electrode layer may be arranged at a side of the first base adjacent to the liquid crystal layer. In other words, for a touch panel of the touch display device, it may be an on-cell or an in-cell touch panel, which will not be particularly defined herein.

For the touch display device 100, the above description is given by taking the color filter layer at a side of the first base adjacent to the liquid crystal layer as an example, but the present disclosure is not limited thereto. In some other embodiments of the present disclosure, the color filter layer may be arranged at a side of the second substrate adjacent to the liquid crystal layer. In other words, for a display panel of the touch display device, it may be a Twisted Nematic (TN) liquid crystal display panel, a Vertical Alignment (VA) liquid crystal display panel or an In-plane Switching (IPS) liquid crystal display panel, which will not be particularly defined herein.

As shown in FIGS. 4 to 7, the present disclosure provides in some embodiments a method for manufacturing a touch display panel, which includes the following steps.

Step 101: providing a first base 210 and dividing the first base 210 into electrode regions 2101 and wiring regions 2102. In this step, at first, the first base 210 may be divided into a function region and a peripheral region for a touch display device to be manufactured, and then the function region may be further divided into the electrode regions 2101 and the wiring regions 2102 arranged alternately.

In Step 102: forming a touch electrode layer 211 at a side of the first base 210. A coverage ratio of the touch electrode layer 211 at the electrode region 2101 is greater than a coverage ratio of the touch electrode layer 211 at the wiring region 2102. In this step, at first an electrode layer may be deposited at a side of the first base 210, and then etched so as to form the touch electrode layer 211. Each electrode region 2101 may have an area greater than that of each wiring region 2102. The touch electrode layer 211 is mainly configured to achieve a touch function of the touch display device, so electrodes of the touch electrode layer 211 for the touch function, which are acquired by etching the electrode layer, are substantially arranged at the electrode regions 2101. The wiring regions 2102 are mainly used for the layout of wires which are spaced apart from each other. A larger portion of the wring region 2102 is not covered by the wires, i.e., a smaller portion of the wring region 2102 is covered by the electrodes. Hence, the coverage ratio of the touch electrode layer 211 at the electrode regions 2101 is greater than the coverage ratio of the touch electrode layer 211 at the wiring regions 2102.

The resultant touch electrode layer 211 includes a plurality of first sensing electrodes 2111 extending in a column direction and a plurality of second sensing electrodes 2112 extending in the column direction. The first sensing electrodes and the second sensing electrodes are arranged alternately. Each of the first sensing electrodes includes a plurality of sub-electrodes arranged in the column direction and independent of each other. Each sub-electrode is connected to a driver through an individual lead 2111b, and the sub-electrodes in an identical row are connected to each other through a lead.

Step 103: forming a color filter layer 212 on the first base 210 to acquire a first substrate 21. A light transmittance of the color filter layer 212 and a light transmittance of the touch electrode layer 211 are capable of compensating for each other, so that a difference between a light transmittance of the first substrate 21 at the electrode region 2101 and a light transmittance of the first substrate 21 at the wiring region 2102 is smaller than a predetermined threshold.

In Step 103, when forming the color filter layer 212 on the first base 210, a black matrix layer, a red color filter layer, a green color filter layer and a blue color filter substrate may be sequentially deposited on the first base 210, and then exposure and etching processes are implemented to form the color filter layer 212. Also, a protection layer 213 may be formed at a side of the color filter layer 212 away from the first base 210, so as to acquire the first substrate 21.

In order to prevent the occurrence of different light transmittances due to the different coverage ratios of the touch electrode layer 211 on the first base 210, the light transmittance of the color filter layer 212 and the light transmittance of the touch electrode layer 211 may be capable of compensating for each other, so that the difference between the light transmittance of the first substrate 21 at the electrode region 2101 and the light transmittance of the first substrate 21 at the wiring region 2102 is smaller than the predetermined threshold.

Step 104: providing a second substrate 22.

Step 105: enabling the first substrate 21 and the second substrate 22 to be arranged opposite to each other to form a cell, and filling liquid crystals 23 between the first substrate and the second substrate, so as to form the touch display panel 200.

In a possible embodiment of the present disclosure, prior to Step 103, the method may further include: collecting a first light transmittance of the touch electrode layer at the electrode region and a second light transmittance of the touch electrode layer at the wiring region; determining a first ratio of the first light transmittance to a predetermined reference value and a second ratio of the second light transmittance to the predetermined reference value; and determining a first thickness of the color filter layer at the electrode region and a second thickness of the color filter layer at the wiring region in accordance with the first ratio and the second ratio respectively.

In this step, subsequent to the formation of the touch electrode layer 211 on the first base 210, it is necessary to collect the first light transmittance of the touch electrode layer 211 at the electrode region 2101 and the second light transmittance of the touch electrode layer 211 at the wiring region 2102. Next, the first ratio of the first light transmittance to the predetermined reference value and the second ratio of the second light transmittance to the predetermined reference value may be determined. Because it is necessary to compensate for the light transmittance of the touch electrode layer 211 with the light transmittance of the color filter layer 212, after the determination of the first ratio and the second ratio, it is necessary to determine the first thickness of the color filter layer 212 at the electrode region 2101 and the second thickness of the color filter layer 212 at the wiring region 2102 in accordance with the first ratio and the second ratio respectively.

In a possible embodiment of the present disclosure, the step of forming the color filter layer on the first base may include forming the color filter layer 212 on the first base 210 in accordance with the first thickness and the second thickness. A thickness of the color filter layer 212 at the electrode region 2102 is equal to the first thickness, a thickness of the color filter layer 212 at the wiring region 2101 is equal to the second thickness, and the thickness of the color filter layer 212 at the electrode region 2101 is smaller than the thickness of the color filter layer 212 at the wiring region 2102.

During the manufacture of the color filter layer 212, in order to enable the thickness of the color filter layer 212 at the electrode region 2101 to be smaller than the thickness of the color filter layer 212 at the wiring region 2102, after the deposition of the color filter layer 212, the color filter layer may be exposed and etched using a half-tone or gray-tone mask, so as to form the color filter layer 212 having different thicknesses. In addition, during a black matrix layer, a red color filter layer, a green color filter layer and a blue color filter layer are sequentially deposited and then etched to form a black matrix, a red color filter unit, a green color filter unit and a blue color filter unit, the half-tone or gray-tone mask may be used to form the black matrix, the red color filter unit, the green color filter unit and the blue color filter unit with different thicknesses, so as to form the color filter layer 212 with different thicknesses.

The above description is given by taking the color filter layer arranged on the first base as an example, but the present disclosure is not limited thereto. In some other embodiments of the present disclosure, the color filter layer may also be formed on the second substrate.

In a possible embodiment of the present disclosure, the step of forming the touch electrode layer 211 and the color filter layer 212 may include forming the color filter layer 212 at a side of the first base 210 adjacent to the liquid crystal layer and forming the touch electrode layer 211 at a side of the first base 210 away from the liquid crystal layer.

According to the touch display device, the touch display panel and the method for manufacturing the touch display panel in the embodiments of the present disclosure, the touch display panel includes the first substrate, the second substrate and the liquid crystal layer. The first substrate includes the first base, the touch electrode layer and the color filter layer. The touch electrode layer is arranged at any side of the first base, and the first base is divided into the electrode region and the wiring region. The light transmittance of the color filter layer and the light transmittance of the touch electrode layer are capable of compensating for each other, so that the difference between the light transmittance of the first substrate at the electrode region and the light transmittance of the first substrate at the wiring region is smaller than the predetermined threshold. As a result, it is able to provide the entire touch display panel with a uniform light transmittance, thereby to prevent the occurrence of bright and dark stripes during the touch and display procedures.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display panel, comprising a first substrate, a second substrate arranged opposite to the first substrate, and a liquid crystal layer arranged between the first substrate and the second substrate, wherein
the first substrate comprises a first base, a touch electrode layer and a color filter layer;
the touch electrode layer is arranged at any side of the first base, and the first base is divided into an electrode region and a wiring region; and
a coverage ratio of the touch electrode layer at the electrode region is greater than a coverage ratio of the touch electrode layer at the wiring region, and a light transmittance of the color filter layer and a light transmittance of the touch electrode layer are capable of compensating for each other, so that a difference between a light transmittance of the first substrate at the electrode region and a light transmittance of the first substrate at the wiring region is smaller than a threshold,
wherein a thickness of the color filter layer at the electrode region is less than a thickness of the color filter layer at the wiring region.

2. The touch display panel according to claim 1, wherein the light transmittance of the first substrate at the electrode region is equal to the light transmittance of the first substrate at the wiring region.

3. The touch display panel according to claim 1, wherein the color filter layer is arranged at a side of the first base adjacent to the liquid crystal layer, and the touch electrode layer is arranged at a side of the first base away from the liquid crystal layer.

4. The touch display panel according to claim 3, further comprising a protection layer, wherein the color filter layer is arranged between the first base and the protection layer.

5. The touch display panel according to claim 1, wherein the touch electrode layer comprises a plurality of first sensing electrodes extending in a column direction and a plurality of second sensing electrodes extending in the column direction, and the first sensing electrodes and the second sensing electrodes are arranged alternately.

6. The touch display panel according to claim 5, wherein each of the first sensing electrodes comprises a plurality of sub-electrodes arranged in the column direction and independent of each other, each sub-electrode is connected to a driver through an individual first lead, and the sub-electrodes in an identical row are connected to each other through a lead.

7. The touch display panel according to claim 6, wherein each of the second sensing electrodes is connected to the driver through a second lead.

8. The touch display panel according to claim 1, wherein the electrode region has an area greater than that of the wiring region.

9. A touch display device comprising the touch display panel according to claim 1.

10. A method for manufacturing a touch display panel, comprising:
providing a first base and dividing the first base into an electrode region and a wiring region;
forming a touch electrode layer at any side of the first base, a coverage ratio of the touch electrode layer at the electrode region being greater than a coverage ratio of the touch electrode layer at the wiring region;
forming a color filter layer on the first base to acquire a first substrate, a light transmittance of the color filter layer and a light transmittance of the touch electrode layer being capable of compensating for each other so that a difference between a light transmittance of the first substrate at the electrode region and a light transmittance of the first substrate at the wiring region is smaller than a threshold, a thickness of the color filter layer at the electrode region being less than a thickness of the color filter layer at the wiring region;
providing a second substrate; and
enabling the first substrate and the second substrate to be arranged opposite to each other to form a cell, and filling liquid crystals between the first substrate and the second substrate, so as to form the touch display panel.

11. The method according to claim 10, wherein prior to the forming the color filter layer on the first base to acquire the first substrate, the light transmittance of the color filter layer and the light transmittance of the touch electrode layer being capable of compensating for each other so that the difference between the light transmittance of the first substrate at the electrode region and the light transmittance of the first substrate at the wiring region is smaller than the threshold, the method further comprises:
collecting a first light transmittance of the touch electrode layer at the electrode region and a second light transmittance of the touch electrode layer at the wiring region;
determining a first ratio of the first light transmittance to a reference value and a second ratio of the second light transmittance to the reference value; and
determining a first thickness of the color filter layer at the electrode region and a second thickness of the color filter layer at the wiring region in accordance with the first ratio and the second ratio respectively.

12. The method according to claim 10, wherein the forming the color filter layer on the first base comprises forming the color filter layer on the first base in accordance with the first thickness and the second thickness, wherein a thickness of the color filter layer at the electrode region is equal to the first thickness, and a thickness of the color filter layer at the wiring region is equal to the second thickness.

13. The method according to claim 10, wherein the forming the touch electrode layer and the color filter layer comprises forming the color filter layer at a side of the first base adjacent to the liquid crystal layer and forming the touch electrode layer at a side of the first base away from the crystal layer.

14. The method according to claim 10, wherein the forming the touch electrode layer comprises forming a plurality of first sensing electrodes extending in a column direction and a plurality of second sensing electrodes extending in the column direction, wherein the first sensing electrodes and the second sensing electrodes are arranged alternately, each of the first sensing electrodes includes a plurality of sub-electrodes arranged in the column direction and spaced apart from each other, each sub-electrode is connected to a driver through a separate lead, and the sub-electrodes in an identical row are connected to each other through a lead.

\* \* \* \* \*